United States Patent [19]
Dixon

[11] Patent Number: 6,068,333
[45] Date of Patent: May 30, 2000

[54] DUAL SUPPORT UNIT BICYCLE SEAT

[76] Inventor: Jeffrey Dixon, 2 Woodside Drive, Riverview, New Brunswick, Canada, E1B 4G9

[21] Appl. No.: 09/369,977

[22] Filed: Aug. 6, 1999

[51] Int. Cl.[7] .................................................. B62J 1/20
[52] U.S. Cl. .................... 297/201; 297/214; 297/203; 297/195.13; 297/219.11; 297/DIG. 6
[58] Field of Search .................................. 297/201, 203, 297/195.13, 214, 219.11, DIG. 6

[56] References Cited

U.S. PATENT DOCUMENTS

| | | | |
|---|---|---|---|
| 545,224 | 8/1895 | Eddy | 297/201 |
| 576,070 | 1/1897 | Deitzler | 297/201 X |
| 606,124 | 6/1898 | Craig | 297/201 X |
| 612,972 | 10/1898 | Leech | 297/201 X |
| 642,191 | 1/1900 | Wright | 297/201 |
| 694,875 | 3/1902 | Meighan | 297/201 |
| 3,243,231 | 3/1966 | Duffy | 297/214 X |
| 4,369,998 | 1/1983 | Blase | 297/201 X |
| 4,512,608 | 4/1985 | Erani | 297/201 |
| 4,877,286 | 10/1989 | Hobson et al. | 297/201 X |
| 5,709,430 | 1/1998 | Peters | 297/201 |
| 5,890,760 | 4/1999 | Kirstein | 297/214 X |

*Primary Examiner*—Peter M. Cuomo
*Assistant Examiner*—Rodney B. White
*Attorney, Agent, or Firm*—Pierce Atwood; Chris A. Caseiro

[57] ABSTRACT

An improved bicycle seat designed to prevent damage to the rider's health by transferring the riders weight from the sub scrotal area to the sit bones. The bicycle seat includes a single piece seat rail, a forward pad, a fastener for securing the forward pad to the seat rail, a combination of fasteners for securing the dual support units to the seat rail, and dual support units each having a seat platform and a seat pad. The dual support units have a plurality of adjustments allowing them to be independently positioned by moving them horizontally inwards and outwards and horizontally forwards and backwards

19 Claims, 3 Drawing Sheets

DUAL SUPPORT UNIT BICYCLE SEAT

BACKGROUND OF THE INVENTION

In general this invention relates to seats used in the operation of foot powered devices such as a bicycle or exercise machine, and in particular to said seats which support the rider by a form of dual support with a plurality of adjustments for the prevention of damage to the rider's health.

It is now well established that single platform bicycle seats damage the health of male riders because they force the rider to sit on his sub scrotal area and thus his weight compresses or crushes the arteries and nerves in this area which are necessary for the healthy functioning of the penis. The present invention has solved this problem by transferring the rider's weight from the sub scrotal area to the sit bones through the use of a closed configuration seat rail, by eliminating the sub scrotal contact area, and by employing dual support units which are aligned directly under the sit bones.

While some prior art devices such as those described in U.S. Pat. No. 5,123, 698; U.S. Pat. No. 4,877,286; U.S. Pat. No. 4,387,925; U.S. Pat. No. 5,709,430 have certain similarities to the present invention, none of them teach, or suggest all of the features and advantages herein disclosed

SUMMARY OF THE INVENTION

Because single platform bicycle seats damage the health of male riders by causing, in the sub scrotal area, the compressing or crushing of arteries and nerves necessary for the healthy functioning of the penis, it is absolutely necessary to find a seat configuration that will eliminate the sub scrotal contact area and transfer the rider's weight onto his sit bones. Bicycle riders will experience comfort, safety, and enhanced performance by using the seat disclosed herein.

The present invention accomplishes, in four ways, its primary object of providing a bicycle seat which will transfer the rider's weight off the sub scrotal area and onto the sit bones. Firstly, the sub scrotal contact area of single platform bicycle seats has been eliminated. Secondly, dual support units are provided so that when sitting the rider's weight will be transferred to his sit bones. Thirdly, the seat rail to which the dual support units are secured is configured in such a way that the dual support units on which the rider sits may be independently adjusted so that any potential contact with the sub scrotal area is further eliminated. Fourthly, the seat platforms of the dual support units are manufactured in such a way as to give the dual support units another means of being independently adjusted so that any potential contact with the sub scrotal area is further eliminated.

Another object of this invention is to provide a dual support unit bicycle seat whose dual support units may be independently adjusted by moving the dual support units horizontally inwards and outwards. This is accomplished by the manner in which the seat rail is configured, the removability of the seat pads, the holes drilled in the seat platforms, and the manner in which the dual support units are secured to the seat rail.

Another object of this invention is to provide a dual support unit bicycle seat whose dual support units may be independently adjusted by moving the dual support units horizontally forwards and backwards. This is accomplished by the removability of the seat pads, the drilled holes in the seat platforms, the manner in which the seat rail is configured and the manner in which the dual support units are secured to the seat rail.

Another object of this invention is to provide a dual support unit bicycle seat whose seat platforms can be removed and replaced due to damage or should the rider desire seat platforms of a different size, material, shape or colour.

Another object of this invention is to provide a dual support unit bicycle seat whose seat pads can be removed and reattached should the rider desire to change the position of the dual support units; and removed and replaced due to damage or should the rider desire seat platform pads of a different colour, material, and/or thickness and density thus providing more or less cushioning effect.

Another object of this invention is to provide a removable, reattachable and replaceable pad covering the horizontal forward section of the seat rail to act as a guide for seating the rider and for protection should said rider miss the seat when sitting. The pad is removable should the rider desire to use the seat without the pad; removable and replaceable due to damage; removable and reattachable should the rider desire a pad of different size, material, colour, and/or thickness; and reattachable should the rider, after using the seat for some time without the pad, decide to reattach it.

In carrying out this invention in the illustrative embodiment thereof, a dual support unit bicycle seat is provided to protect the rider's health and improve performance by eliminating pressure to the sub scrotal area. Conveniently the user secures the dual support unit bicycle seat to the seatpost by means of the seatpost's integral seat clamp or a seat clamp which is a separate unit from the seatpost.

The invention includes the following:
1. A single piece seat rail with a closed configuration.
2. Dual support units each including:
   a). 1 seat platform with drilled holes.
   b). 1 removable, reattachable and replaceable seat pad.
3. A combination of fastening mechanisms
4. 1 removable and replaceable pad covering the horizontal forward section of the seat rail.
5. 1 fastening mechanism for securing the pad to the horizontal forward section of the seat rail.

The present invention is unique from prior arts in a number of ways:
1. It is componental in nature. Being as such the present invention may be easily disassembled and reassembled, and have a number of its components: seat platforms, seat pads, forward pad, fastener for securing the forward pad and fasteners for securing the dual support platforms, replaced with similar components of differing specification. The seat rail provides the means for a fully independent horizontal inward and outward adjustment of the dual support units in an infinite number of positions without the need for a special or unconventional seatpost and/or seat clamp.
2. The seat rail is manufactured by submitting a single piece of rod metal to a bending machine and then welding the ends together to form a closed circuit.
3. The seat platforms provide the means for a fully independent horizontal forward and backward adjustment of the dual support units.
4. The seat platforms may be removed and replaced should they become damaged or should rider desire seat platforms of a different colour, shape, material, or size.

The seat platforms are constructed by cutting flat sheets of plastic, although they may be constructed by a molding process; and have their drilled holes produced by a standard electrical drill.

5. Due to their self-adhesion the seat pads may be removed and reattached.
6. The seat pads provide the means for both a fully independent horizontal inward and outward adjustment of the dual support units in an infinite number of positions, and a fully independent horizontal forward and backward adjustment of the dual support units.
7. The seat pads may be removed and replaced due to damage or should the rider desire seat pads of a different colour, material, and/or density and thickness thus providing more or less cushioning effect.

The seat pads are preferably manufactured by cutting them from a roll of foam.

8. The forward pad may be removed; may be removed and replaced should the rider desire a forward pad of a different colour; and may be removed and reattached should the rider, after riding a time without the forward pad, desire to reattach it.
9. The manner in which the forward pad is attached, and the removeability of the forward pad provides the rider free and unrestricted access for securing the present invention to the seatpost, for removing the present invention from the seatpost, and for adjusting it on the seatpost. Prior arts do not provide such easy positioning.

The forward pad is preferably cut from a large roll of foam.

BRIEF DESCRIPTION OF THE DRAWINGS

This invention together with all aspects and elements thereof will be most fully understood from the following description in conjunction with the provided drawings.

Five sheets of drawings are furnished, sheet one contain FIG. 1 a side view of the assembled invention. Here we see how the forward pad and each of the dual support units are affixed to the seat rail.

Figure 2:
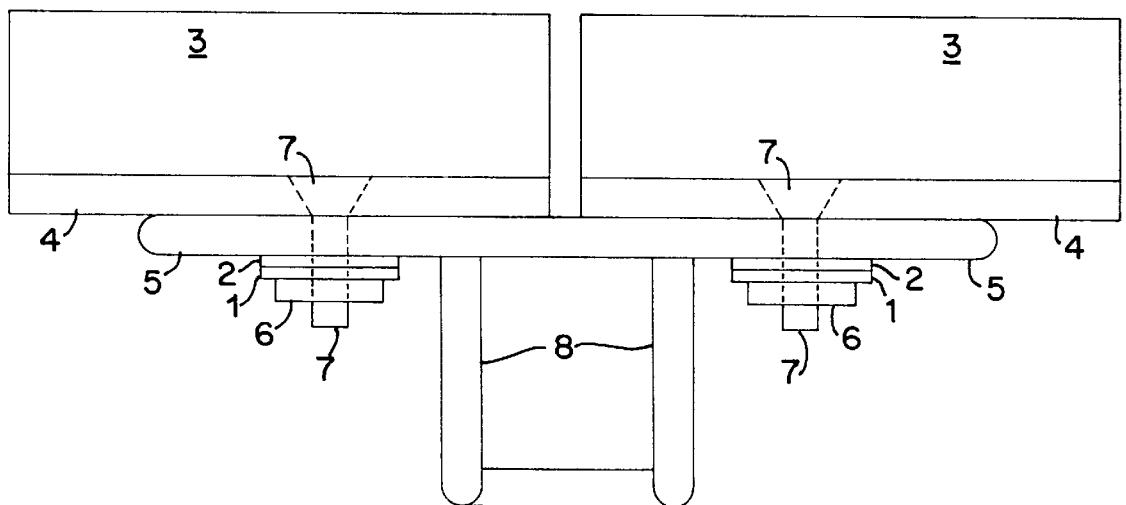

Sheet two contain FIG. 2 back view of the particially assembled invention with the forward pad removed. Here we see how dual support units are independently affixed to the seat rail and how they may be adjusted independently thereby allowing the rider combinations of the adjustments and movements thereof.

Figure 3:
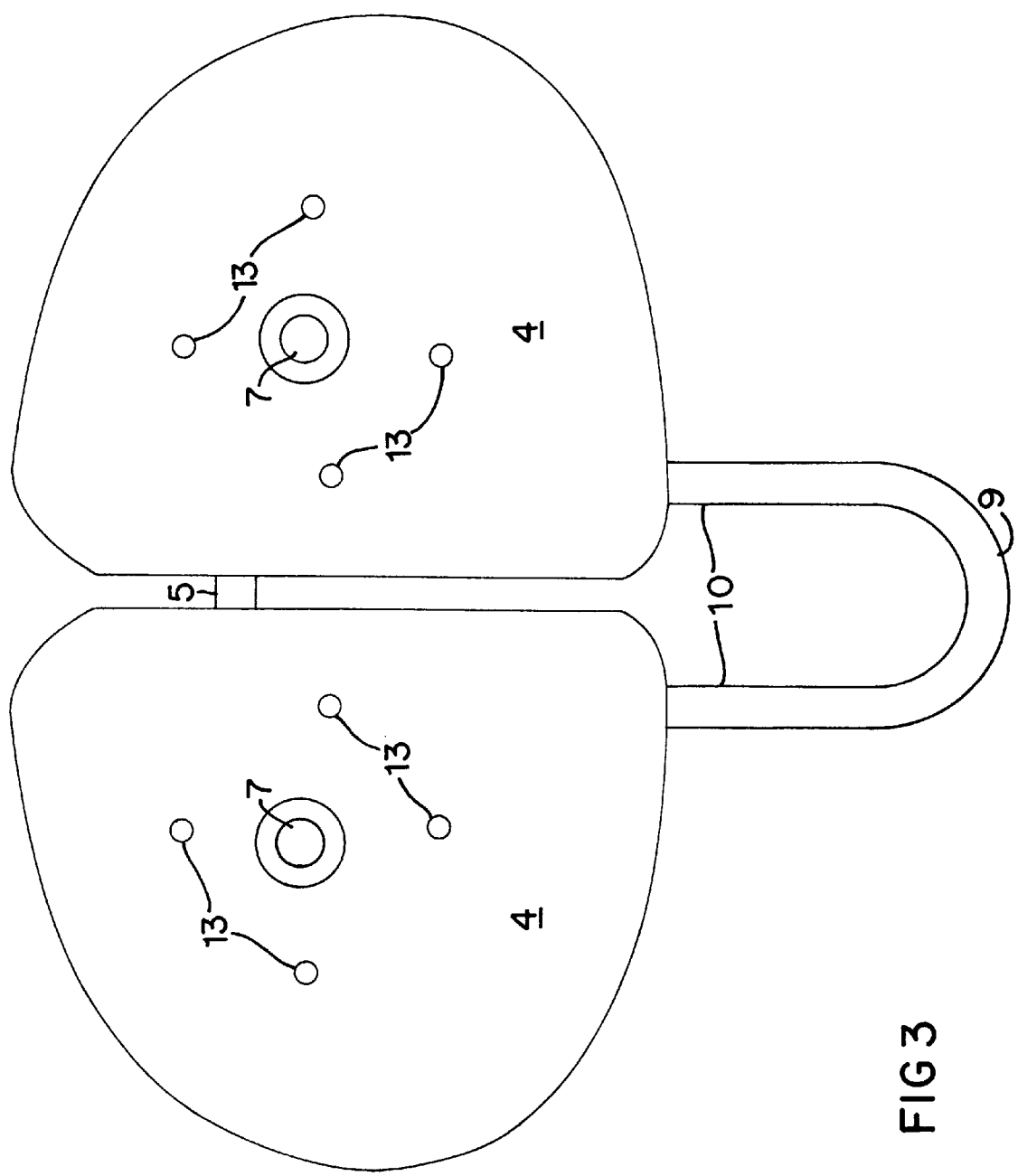

Sheet three contains FIG. 3 a top view of the partitially assembed invention with the seat pads removed from the seat platforms and the forward pad removed from the horizontal forward section of the seat rail. Here we see how the dual support units are independently affixed to the seat rail and how they may be adjusted independently thereby allowing the rider combinations of the adjustments and movements thereof.

Figure 4:
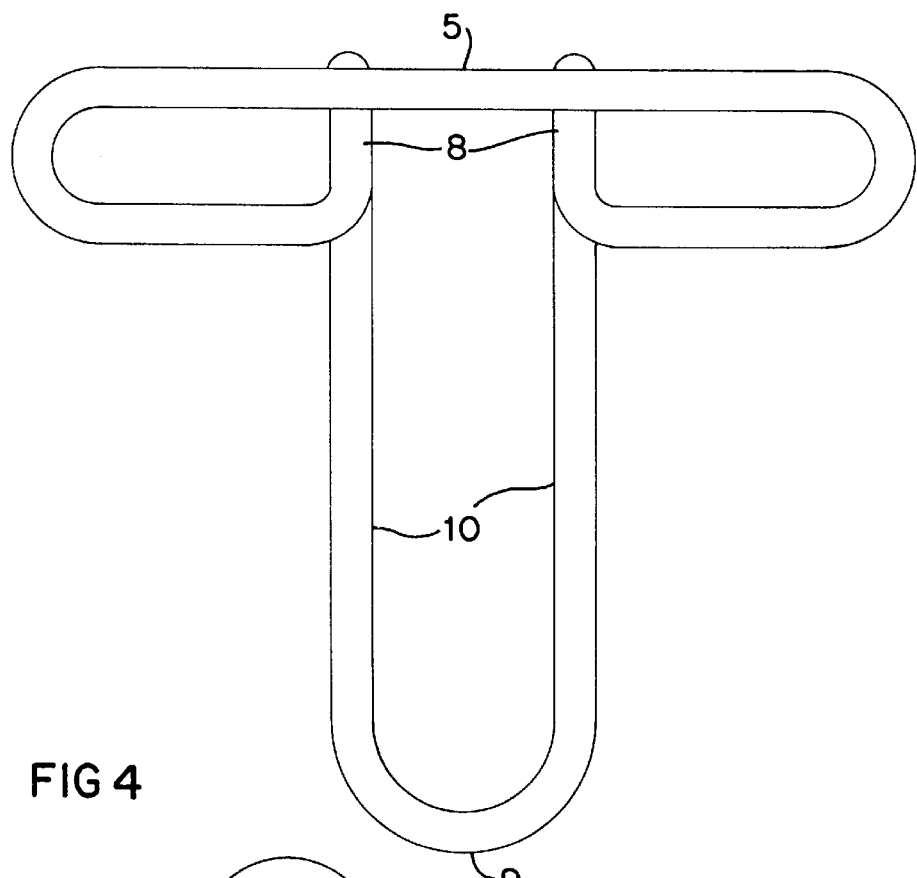

Sheet four contains FIG. 4 a top view of the seat rail. Here we see the seat rail's closed configuration which allows the dual support units to be adjusted independently thereby allowing the rider combinations of the adjustments and movements thereof.

Figure 5:
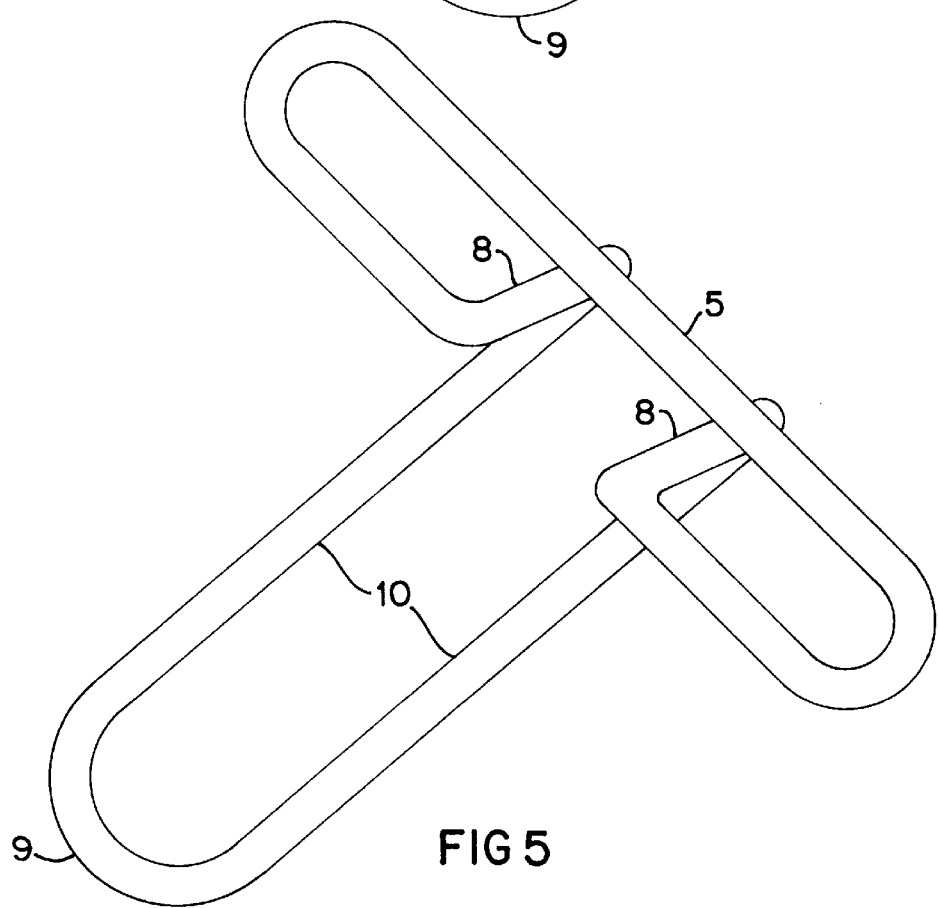

Sheet five contains FIG. 5 an isometric view of the seat rail. Here we see the seat rail's vertical section which gives the dual support units clearance over the top of seatpost clamps and the seat rail's closed configuration which allows the dual support units to be adjusted independently thereby allowing the rider combinations of the adjustments and movements thereof.

DETAILED DESCRIPTION OF THE DRAWINGS

Figure 1:
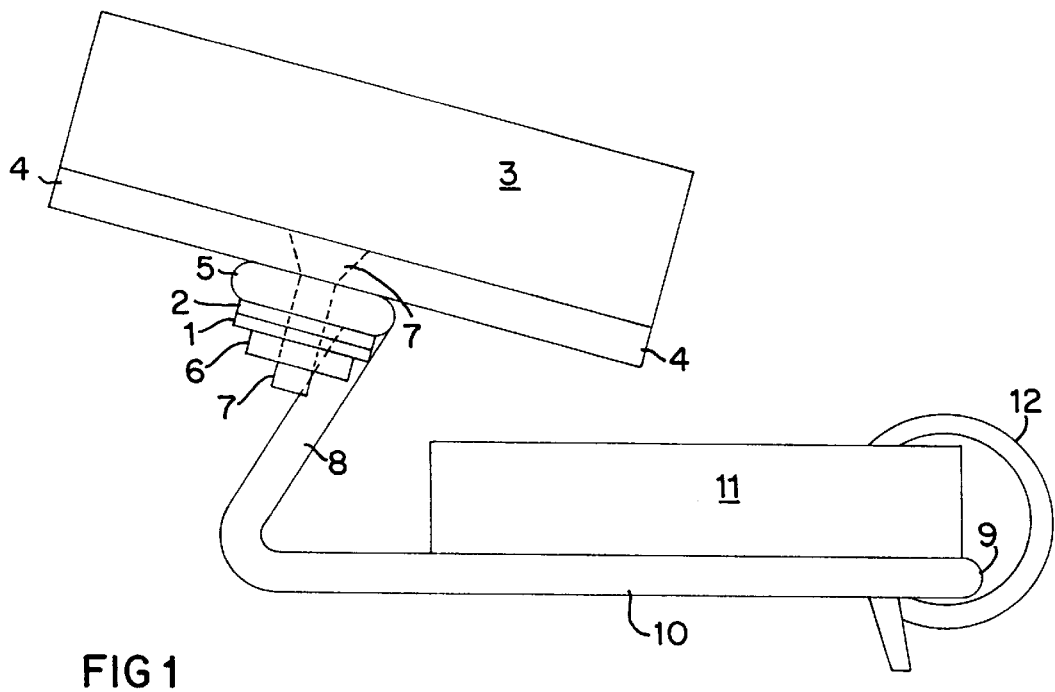

Referring now to FIG. 1 we see a side view of the assembled bicycle seat with a cross section of the seat platform 4 so that the bolt 7 is shown. In the figure the horizontal forward section 10 of the seat rail is shown as is the vertical section 8 of the seat rail. The right side of the seat rail's horizontal perpendicular rear section 5 is shown the seat platform 4 secured to it by the bolt 7 which has passed through one of the countersunk holes drilled in the seat platform 4, the right side of the seat rail's horizontal perpendicular rear section 5, locking washer 2, toothed locking washer 1, and locking nut 6. The forward pad 11 is secured to the horizontal main body by means of the cable tie 12.

In FIG. 2 we see a rear view of the partitially assembled bicycle seat with the forward pad 11 removed, and with a cross section of the seat platforms 4 so that the bolts 7 are shown. The seat rail's horizontal perpendicular rear section 5 is shown with the dual support units secured to it by the bolts 7 each of which has passed through one of the countersunk holes drilled in the seat platforms 4, the seat rail's horizontal perpendicular rear section 5, locking washer 2, toothed locking washer 1, and locking nut 6.

In FIG. 3 we see a top view of the partitially assembled bicycle seat with the forward pad 11 removed thus revealing the forward end 9 of the seat rail's horizontal forward section 10, and with the seat pads 3 removed thus revealing the drilled holes 13 of the seat platforms 4 and the heads of the bolts 7.

In FIG. 4 we see a top view of the seat rail showing the seat rail's closed configuration, the forward end 9 of the horizontal forward section 10 of the seat rail, the horizontal forward section 10 of the seat rail which is the section of the seat rail secured in a seatpost clamp when the dual support bicycle seat is affixed to a bicycle, and the seat rail's horizontal perpendicular rear section 5 which is the section of the seat rail to which the dual support units are affixed.

In FIG. 5 we see an isometric view of the seat rail showing the seat rail's closed configuration, the vertical section 8 of the seat rail which gives the dual support units clearance over the top of seatpost clamps, the forward end 9 of the horizontal forward section 10 of the seat rail, the horizontal forward section 10 of the seat rail which is the section of the seat rail secured in a seatpost clamp when the dual support bicycle seat is affixed to a bicycle, and the seat rail's horizontal perpendicular rear section 5 which is the section of the seat rail to which the dual support units are affixed.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A bicycle seat for increasing riding comfort and performance while preventing damage to the rider's health, the bicycle seat comprising:

(a) a closed configuration seat rail including a horizontal forward section for clamping into a seatpost, a vertical plane section extending above the height of the seatpost, and a horizontal perpendicular rear section having a top thereof;

(b) a removable left seat platform coupled to said rear section;

(c) a removable right seat platform coupled to said rear section;

(d) a left removable, reattachable and replaceable seat pad secured to said left seat platform (e) a right removable, reattachable and replaceable seat pad secured to said right seat platform;

(f) a removable, reattachable and replaceable pad secured to the forward end of the horizontal forward section of said seat rail; and (g) a reinforcement plate coupled between said top of said horizontal rear section and said left seat platform and said right seat platform.

2. A bicycle seat as set forth in claim 1 wherein said seat platforms are of a concave shape.

3. A bicycle seat set forth in claim 1 wherein said seat platforms are secured to said seat rail by means of a "quick-release" mechanism.

4. A bicycle seat as set forth in claim 1 wherein said seat platforms are secured to said seat rail by means of a pair of "quick-release" mechanisms.

5. A bicycle seat as set forth in claim 1 wherein said seat platforms are secured to said seat rail by removable bolts.

6. A bicycle seat as set forth in claim 1 wherein said reinforcement plate is a rectangular slotted plate.

7. A bicycle seat as set forth in claim 1 further comprising a bent plate having a vertical section bonded to said vertical section of said seat rail and a horizontal section bonded to said horizontal perpendicular rear section of said seat rail.

8. A bicycle seat as set forth in claim 1 further comprising a reinforcement bar coupled to said vertical section of said seat rail.

9. A bicycle seat as set forth in claim 1 wherein threaded fasteners are bonded to said seat platforms so that the rider may change the position of said seat platforms without having to remove said seat pads.

10. A bicycle seat as set forth in claim 1 wherein said seat platforms and said seat pads are molded together to form one piece.

11. A bicycle seat as set forth in claim 1 wherein said seat pads are self-adhering seat pads.

12. A bicycle seat for increasing riding comfort and performance while preventing damage to the rider's health, the bicycle seat comprising:

(a) a closed configuration seat rail including a horizontal forward section for clamping into a seatpost, a vertical plane section extending above the height of the seatpost, and a horizontal perpendicular rear section having a top thereof;

(b) a removable left seat platform coupled to said rear section;

(c) a removable right seat platform coupled to said rear section;

(d) a left removable, reattachable and replaceable seat pad secured to said left seat platform;

(e) a right removable, reattachable and replaceable seat pad secured to said right seat platform;

(f) a removable, reattachable and replaceable pad secured to the forward end of the horizontal forward section of said seat rail; and (g) a reinforcement bar coupled to said vertical plane section of said seat rail.

13. A bicycle seat as set forth in claim 12 further comprising a reinforcement plate coupled between said top of said horizontal rear section and said left seat platform and said right seat platform.

14. A bicycle seat as set forth in claim 12 wherein said seat platforms are secured to said seat rail by means of a quick-release mechanism.

15. A bicycle seat as set forth in claim 12 wherein fasteners are bonded to said seat platforms so that a rider may change positions of said seat platforms without having to remove said seat pads.

16. A bicycle seat for increasing riding comfort and performance while preventing damage to the rider's health, the bicycle seat comprising:

(a) a closed configuration seat rail including a horizontal forward section for clamping into a seatpost, a vertical plane section extending above the height of the seatpost, and a horizontal perpendicular rear section having a top thereof;

(b) a removable left seat platform coupled to said rear section;

(c) a removable right seat platform coupled to said rear section;

(d) a left removable, reattachable and replaceable seat pad secured to said left seat platform;

(e) a right removable, reattachable and replaceable seat pad secured to said right seat platform;

(f) a removable, reattachable and replaceable pad secured to the forward end of the horizontal forward section of said seat rail;

(g) a reinforcement bar coupled to said vertical plane section of said seat rail; and (h) a reinforcement plate coupled between said top of said horizontal rear section and said left seat platform and said right seat platform.

17. A bicycle seat as set forth in claim 16, wherein said reinforcement bar and said reinforcement plate are formed as a single bent plate coupled to said vertical plane section and said horizontal rear section.

18. A bicycle seat for increasing riding comfort and performance while preventing damage to the rider's health, the bicycle seat comprising:

(a) a closed configuration seat rail including a horizontal forward section for clamping into a seatpost, a vertical plane section extending above the height of the seatpost, and a horizontal perpendicular rear section having a top thereof, wherein said horizontal perpendicular rear section includes an open space therein;

(b) a removable left seat platform coupled to said rear section;

(c) a removable right seat platform coupled to said rear section;

(d) a left removable, reattachable and replaceable seat pad secured to said left seat platform;

(e) a right removable, reattachable and replaceable seat pad secured to said right seat platform;

(f) a removable, reattachable and replaceable pad secured to the forward end of the horizontal forward section of said seat rail; and (g) one or more fasteners couplable to said left seat platform and said right seat platform and arranged to pass through said open space of said horizontal rear section.

19. A bicycle seat A bicycle seat for increasing riding comfort and performance while preventing damage to the rider's health, the bicycle seat comprising:

(a) a closed configuration seat rail including a horizontal forward section for clamping into a seatpost, a vertical plane section extending above the height of the seatpost, and a horizontal perpendicular rear section having a top thereof;

(b) a removable left seat platform coupled to said rear section;

(c) a removable right seat platform coupled to said rear section (d) a left removable, reattachable and replaceable seat pad having self-adhering means for securing said left seat pad to said left seat platform;

(e) a right removable, reattachable and replaceable seat pad having self-adhering means for securing said right seat pad to said right seat platform; and (f) a removable, reattachable and replaceable pad secured to the forward end of the horizontal forward section of said seat rail.

* * * * *